July 14, 1931.  A. J. SLADE  1,814,640
VEHICLE BODY
Filed Dec. 17, 1923
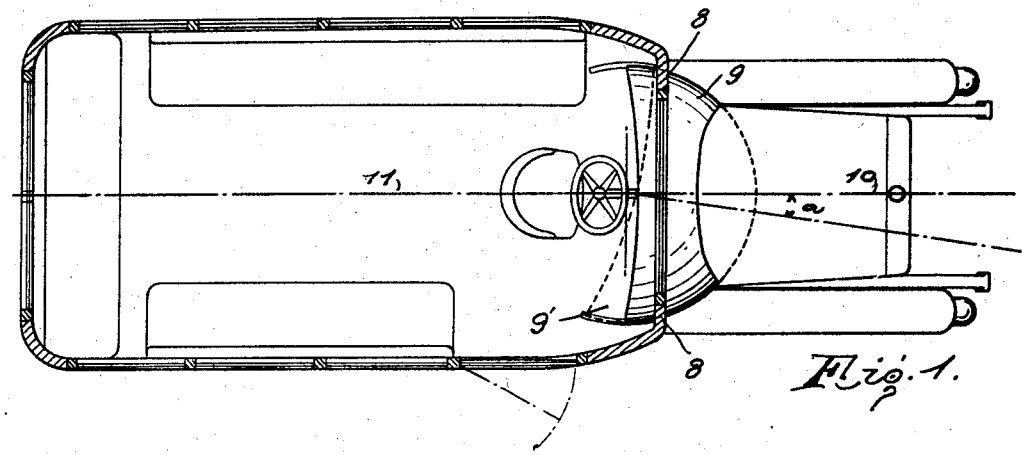
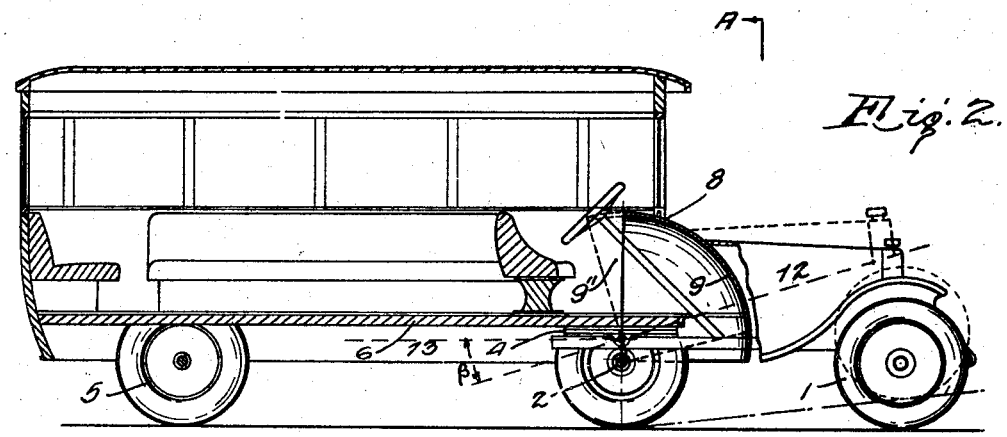
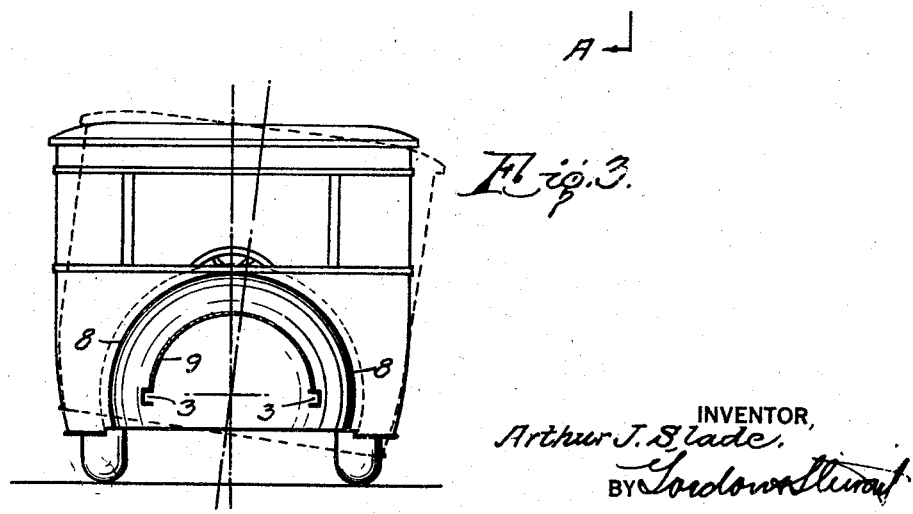
INVENTOR,
Arthur J. Slade.
BY
ATTORNEYS.

Patented July 14, 1931

1,814,640

UNITED STATES PATENT OFFICE

ARTHUR J. SLADE, OF NEW YORK, N. Y.

VEHICLE BODY

Application filed December 17, 1923. Serial No. 681,112.

Vehicles for carrying passengers, merchandise or material of any character have been, through the development of transportation, expanded in size to the practical limit possible to be supported on two axles or other corresponding supporting elements. This development has been such that in building increasingly larger vehicles the practical limit of size for a single vehicle has been reached and it has become necessary for economic reasons to resort to combinations of vehicles coupled together in various ways. Prominent among these combinations are tractors with trailers and semi-trailers to form trains, a trailer being a separate vehicle supported by at least two axles and drawn by a leading or tractor vehicle, and a semi-trailer being a vehicle with at least one axle near one end with the opposite end supported on and drawn by the tractor by means of some form of pivot or pin connection commonly known as a fifth wheel which allows the rear wheels of the trailer to swing to either side of the tractor and may also be so constructed to allow of freedom of movement of the two vehicles relative to each other in both longitudinal and transverse vertical planes. The method generally employed is to carry the forward portion of the trailer upon a fifth wheel mounted upon the tractor, thus distributing the total load between three axles in place of two as in the case of the single unarticulated vehicle. The operator is provided with space upon the tractor for operation and control of the vehicle and the load is carried by a body mounted upon the semi-trailer. There is no union or connection between the body construction on the tractor, which provides only for the driver and assistants, and the body construction on the trailer, which provides only for the merchandise or passengers.

Hitherto it has been necessary in semi-trailer construction to make the body of each trailer and tractor vehicle a separate unit with no permanent direct connection between them to permit direct access or passage between one vehicle and the other, or, when inclosed bodies are used, to maintain a weather tight closure, and at the same time permit freedom of relative movement between the vehicles. The lack of such a flexible or articulated body connection has limited the semi-trailer combination practically to freight carrying purposes and has prevented the adoption of semi-trailers as passenger carriers where it is essential that an all-weather closed-in type of body be used and where the entire vehicle is under one man control with the operator in direct communication with the passengers.

My invention relates to a novel construction by means of which the operator and the passengers or merchandise are placed within the same body, and the angularity between the articulated units, resulting from changes of direction and irregularities of the surfaces over which the vehicle may be operated, is provided for in such manner that regardless of such angularities a constant, permanent closure between the articulated elements is provided and maintained, thus insuring that the interior of the vehicle body will at all times and under all conditions remain weather tight, and free from apertures or openings.

In addition to the inherent economic features of semi-trailer vehicle operation, such as, carrying a greater load for a given over-all length of vehicle, or lessening the wear on road surface by distributing the load over a greater number of axles and the ease of control of the combined unit in traffic, and since the tendency to "snake" is not so marked in the semi-trailer type as in the full (or four-wheeled) trailer type, it is obvious that the safety features are especially important in connection with the carrying of passengers. It is therefore essential to provide a safe and practical means whereby the body is articulated for economic operating conditions and also to provide assurance of safety and comfort of passengers.

The principal object of this invention is to provide a means whereby two or more vehicle bodies may be combined with a direct connection between them and a constant permanent weather tight closure maintained at the place where they are joined together while permitting independent relative movement of the articulated elements of the combined vehicle due to changes of direction of travel or irregularities of level in the surfaces over which they are operated.

A particular purpose is to provide a flexible or articulated body connection between two vehicles which will permit angular displacement of the two vehicles relative to each other in a horizontal plane, in a longitudinal vertical plane, in a transverse vertical plane or simultaneous relative movement in all planes or a combination of these movements about the center of the conventional fifth-wheel providing the usual full universal joint.

A further object is to provide a vehicle body which is flexible or articulated and provided with a portion suitably mounted to permit of longitudinal and transverse angular motion in a horizontal plane and with another portion so mounted and attached to permit of longitudinal and transverse angular motion in a vertical plane, such body being so constructed as to permit of these angular motions simultaneously and of different and varying degrees.

Another object is to provide a connection between two vehicle bodies which will be flexible or articulated to permit angular movement between the vehicles, and which will also permit of ready detachment of one portion or element of the vehicle from the other.

Another object is to provide a vehicle body consisting of sections forming integral constructions with automobile and tractor chassis or running gear.

The preferred embodiment of my invention as applied to automobile construction is shown in the accompanying drawings, which show a vehicle as traveling straight ahead on a flat surface and various departures therefrom are shown by dotted lines. In these drawings:—

Figure 1 represents a sectional view of the preferred form of an articulated vehicle designed as an automobile for passenger carrying purposes having a spherical shaped cowl integral with the tractor part fitting into a circular opening in the front of the body mounted on the trailer part.

Figure 2 is a vertical view, partly in section, of the vehicle shown in Figure 1.

Figure 3 is a transverse elevation of the same vehicle, partly in section at AA of Figure 2.

The dotted lines in Figures 1, 2 and 3 indicate changes of angularity between tractor and trailer elements.

In Figure 2 representing an articulated vehicle of the character described designed for passenger carrying purposes, 1 is the front steering axle, 2 is the tractor driving axle, 3 is the tractor chassis frame, 4 is the fifth wheel mounted upon said chassis frame and universally pivotally connected with the tractor frame, 5 is the trailer axle, 6 is the trailer chassis frame, the forward end of which is carried by the fifth wheel 4. 8 is a circular opening in the front of the body constructed upon the trailer, and 9 is a cowl constructed upon the tractor and placed in such manner as to close the opening 8 in the trailer body. This cowl is a portion of a sphere whose center is the same as the center of the fifth wheel 4. In turning upon a level surface the tractor element, see Figure 1, will assume positions in which its longitudinal axis 10 will be at some angle $\alpha$ to the longitudinal axis 11 of the trailer, both of these axes passing through the center of the fifth wheel 4, and the cowl 9 will assume the position 9' with reference to the body opening 8. By reason of the spherical shape of the cowl, and its center being that of the fifth wheel where the axis 10 of the tractor and axis 11 of the trailer intersect under all angular conditions the cowl will fully and completely close the opening 8. Similarly in elevating or lowering the forward end of the tractor with reference to the trailer as shown in Figure 1, which condition may be brought about by elevations or depressions in the surface upon which the vehicle is operating, the axis 12 of the tractor and axis 13 of the trailer, see Figure 2, will assume angle $\beta$ to one another in a vertical plane and one corresponding position of the cowl in relation to the trailer opening 8 is indicated by 9" when it is evident that the opening 8 is fully closed. In Figure 3 changes of angularity in a transverse vertical plane are indicated in a similar manner, whereby it will be seen that the opening 8 is always closed by the spherical cowl 9. The centering of the cowl on the center of the fifth wheel 4, where the axes of tractor and trailer always intersect regardless of their relative angularity in all directions, insures the complete and permanent closure of the opening 8 by the cowl 9 in its changing positions within this opening. This method of maintaining fixed and continuous closure between the two articulated elements described can be applied to connections between several bodies mounted upon or constructed in connection with any number of articulated units regardless of how they may be propelled and regardless also of variations in direction or degree of angularity between succeeding or following adjacent articulated units.

It is to be understood that further modifications of this invention may be made within the scope of the appended claims without departing from the spirit of the invention.

Having described in general the features in vehicle construction and assembly covered by this application, and having illustrated and described a particular application of it relating to motor vehicles, it is to be understood that this description and application may be modified to suit particular requirements without departing from the spirit of my invention, but what I claim and desire to secure by Letters Patent is:

1. In a vehicle, two or more articulated units, means on the end of one of said units to receive an adjacent unit and complementary means on said adjacent unit adapted for extended interfitting closure engagement with said first named unit independent of any relative angular movement between said units.

2. In an articulated vehicle whose several sections are so connected as to permit relative changes of angularity in all planes, a body closure construction providing interfitting means whereby the several body sections are maintained in weathertight contact regardless of relative angular changes.

3. In a tractor and semi-trailer vehicle having a pivotal connection between said tractor and trailer, through which the axis of the tractor and semi-trailer pass under all conditions of angularity due to surface irregularities or turning movements, a connection comprising a spherical cowl and a circular opening, forming a permanent means of closure between the body constructions of the tractor and trailer.

4. In an articulated vehicle comprising tractor and semi-trailer elements, body sections integral therewith, means whereby said sections conform to changes in angularity in all planes at the same time maintaining permanent closure.

5. In a vehicle having an articulated frame and body, parts mounted thereon overlapping each other to maintain closure under articular movement of the frame in all planes.

6. In a vehicle with a running gear having separate sections flexibly connected for relative movement and sections of a common body mounted on each running gear section with overlapping rigid parts to maintain a closed joining between the body sections in all planes.

7. An automobile vehicle consisting of two articulating elements comprising a tractor and a semi-trailer, each having body parts mounted thereon uniting with each other where they adjoin in articulating to form an inclosure for the operator within the body.

8. In an automobile comprising a tractor flexibly coupled with a semi-trailer, an operator's seat and control mechanism located within an inclosure formed by the union of two or more articulating body parts mounted thereon.

9. In an automobile vehicle consisting of a tractor part joined to articulate with a semi-trailer part, said semi-trailer part having a body compartment extending over a portion of the tractor to form an inclosure for the load carried and the operator, means mounted on the tractor to maintain closure of the body compartment inclosure during relative articular movement of said tractor and said semi-trailer parts.

10. In an automobile vehicle consisting of a tractor and a semi-trailer coupled together to provide for relative vertical and horizontal movement, body parts mounted thereon to form a single inclosed compartment for load and operator, means for maintaining contact between the body parts on the tractor with those on the trailer during said relative vertical and horizontal movements.

Signed by me at New York city, N. Y., this 14th day of December, 1923.

ARTHUR J. SLADE.